Figure 1:
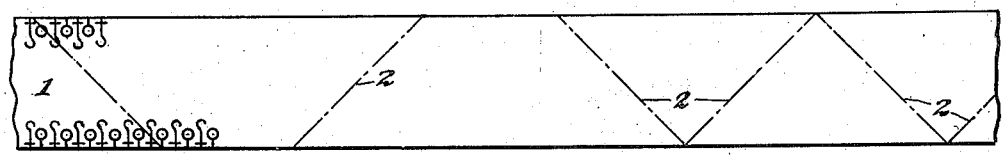

Nov. 23, 1937.   J. R. JOHNSON   2,100,104
MANUFACTURE OF MATTRESSES
Filed Jan. 10, 1936   8 Sheets-Sheet 1

INVENTOR
James Reid Johnson
BY
ATTORNEY

Nov. 23, 1937. J. R. JOHNSON 2,100,104
MANUFACTURE OF MATTRESSES
Filed Jan. 10, 1936    8 Sheets-Sheet 2

INVENTOR
James Reid Johnson
BY
ATTORNEY

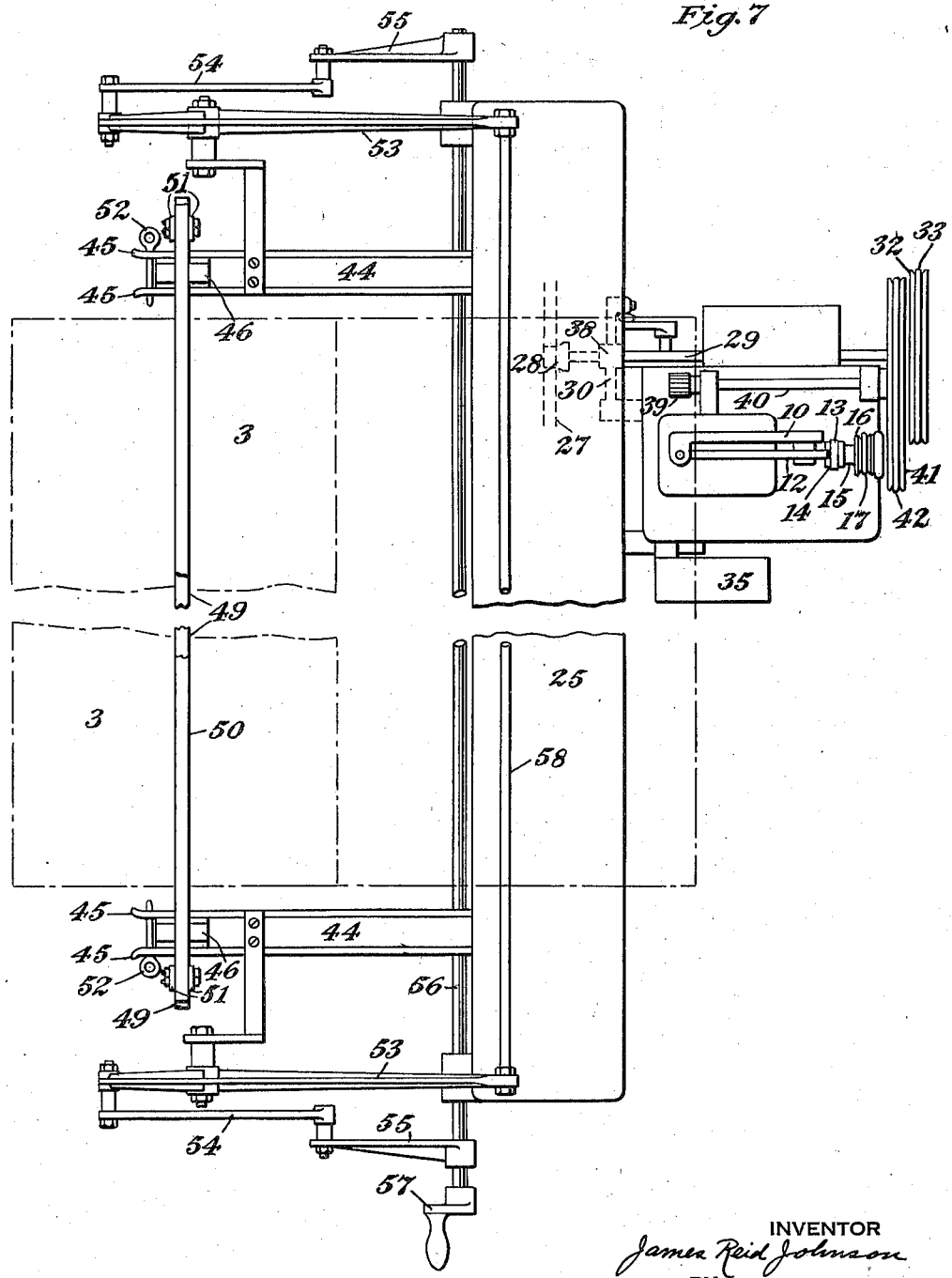

Nov. 23, 1937.    J. R. JOHNSON    2,100,104
MANUFACTURE OF MATTRESSES
Filed Jan. 10, 1936    8 Sheets-Sheet 4
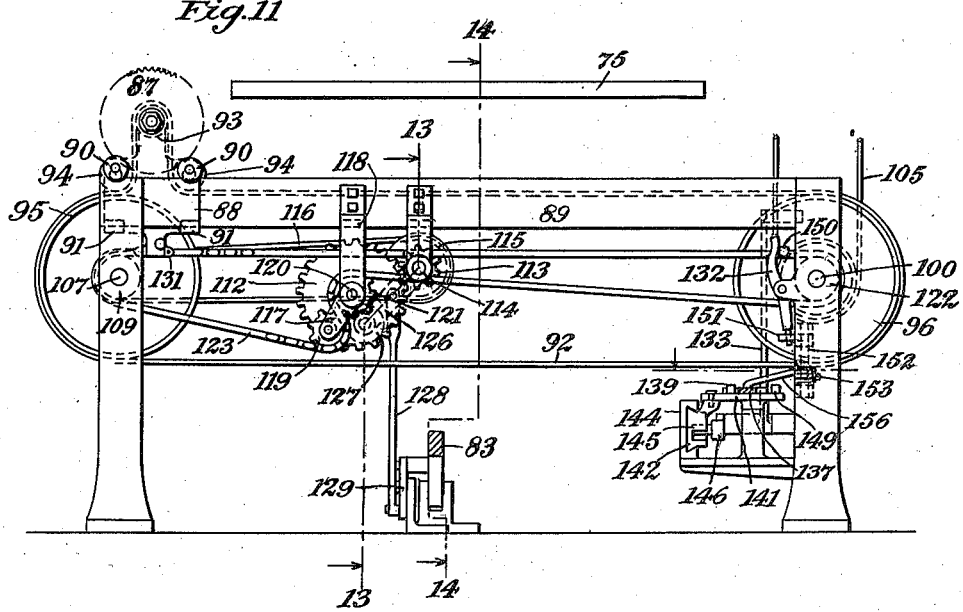
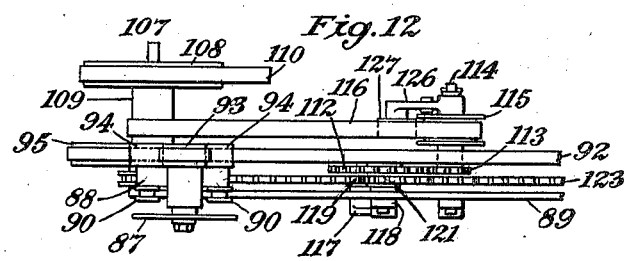
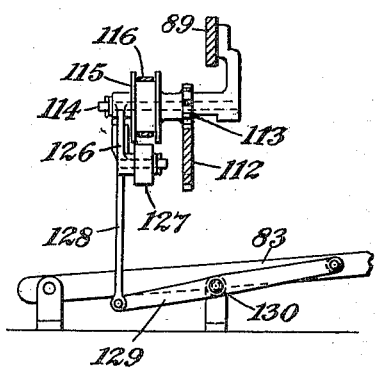
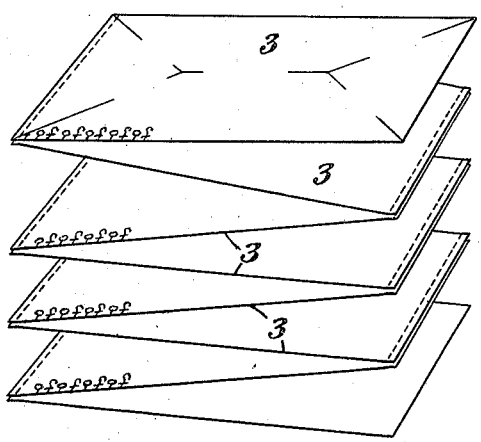
INVENTOR
James Reid Johnson
BY
Anderson Ward
ATTORNEY

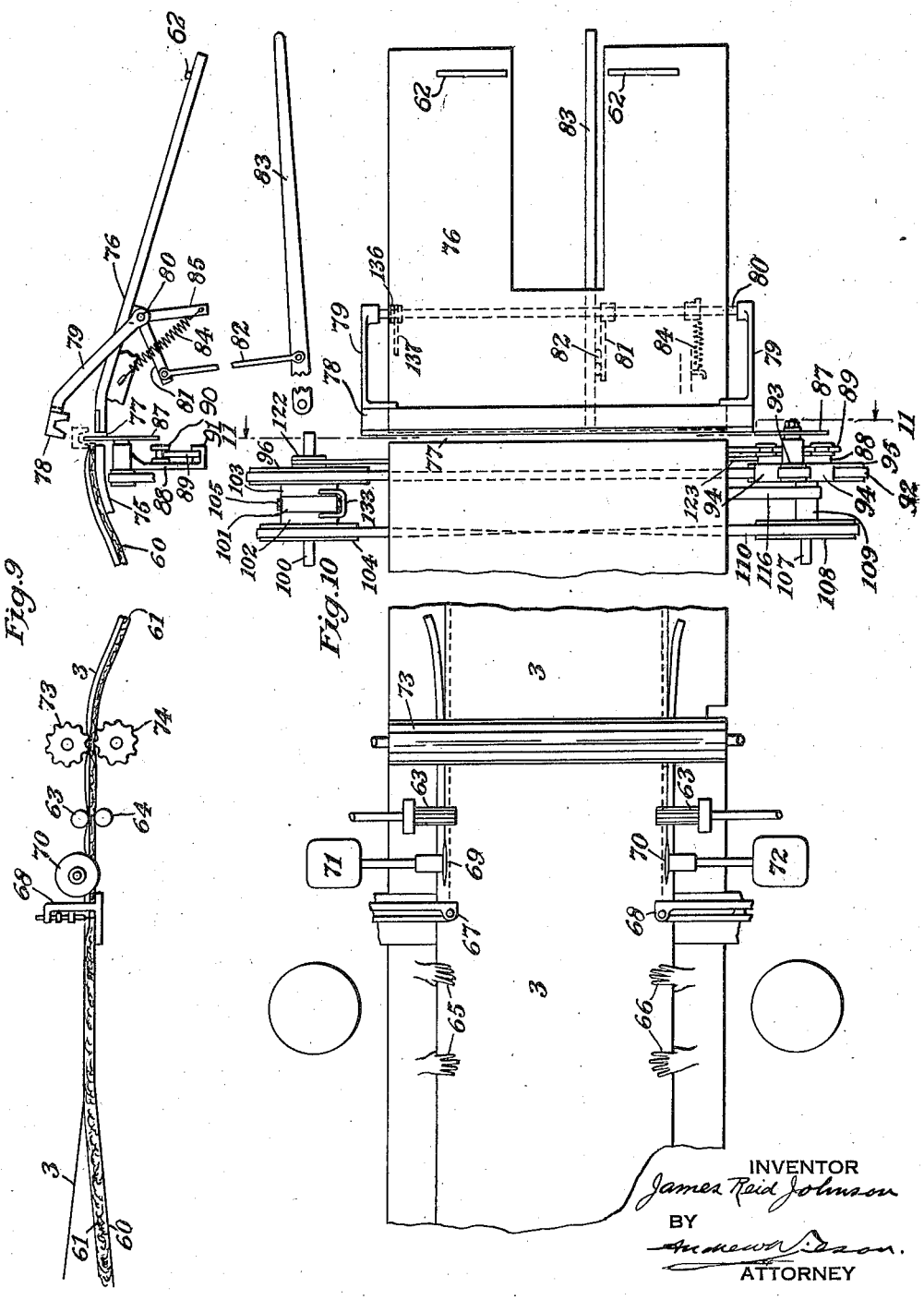

Nov. 23, 1937.     J. R. JOHNSON     2,100,104
MANUFACTURE OF MATTRESSES
Filed Jan. 10, 1936     8 Sheets—Sheet 6
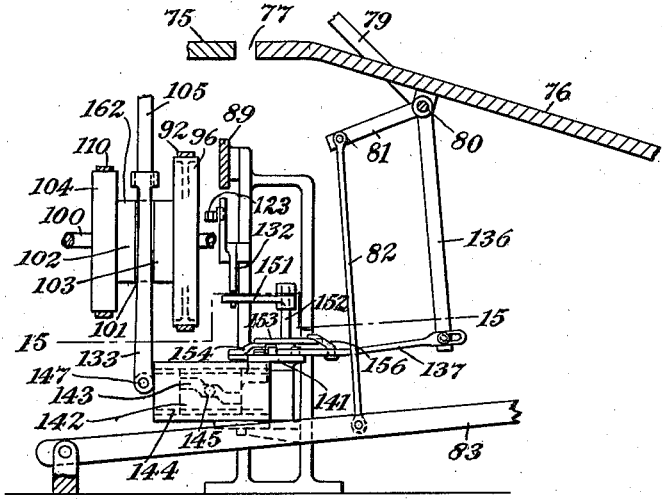
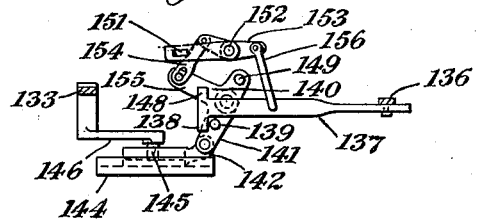
INVENTOR
James Reid Johnson
BY
Andrew Wilson
ATTORNEY

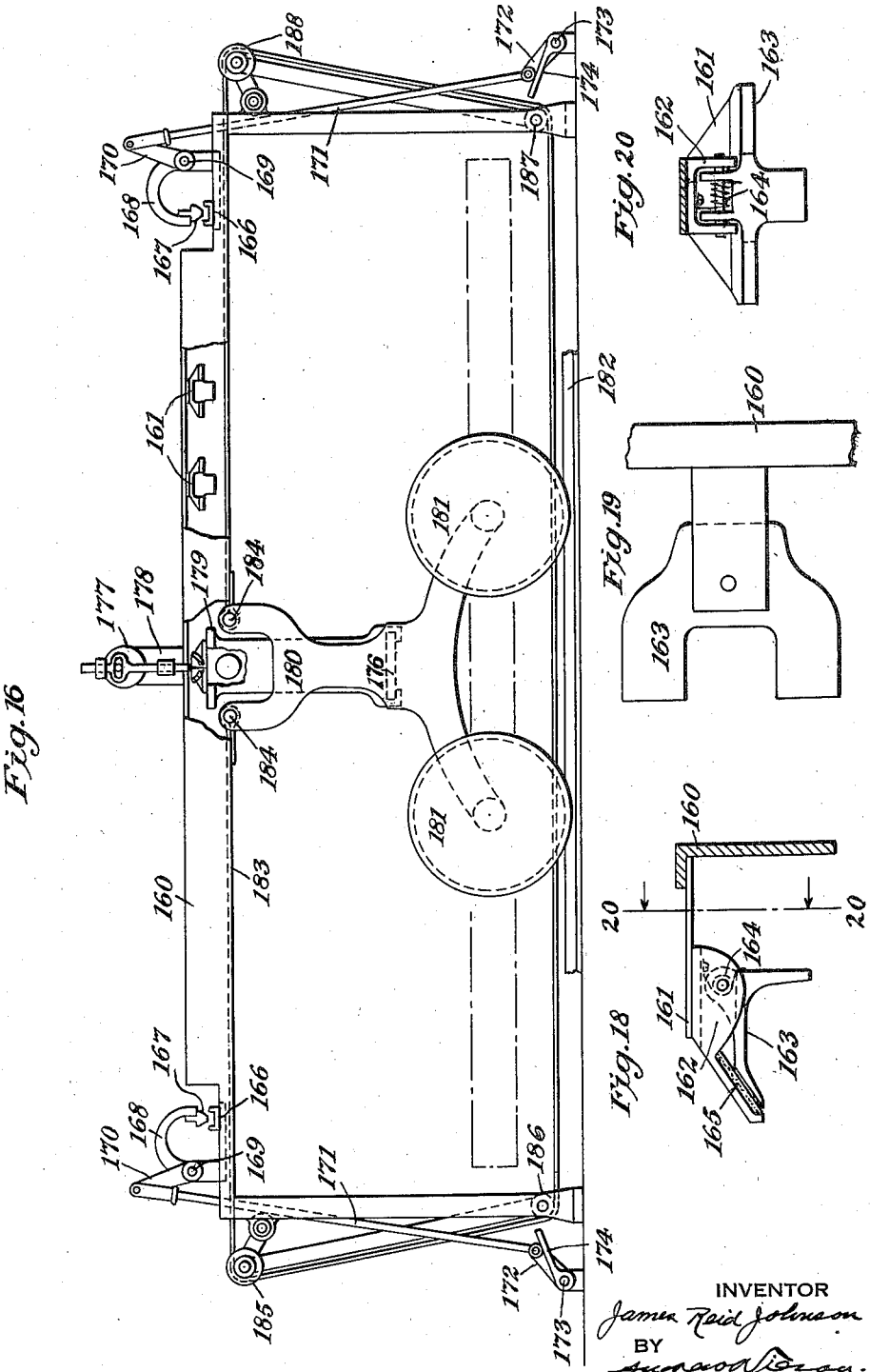

Nov. 23, 1937.  J. R. JOHNSON  2,100,104
MANUFACTURE OF MATTRESSES
Filed Jan. 10, 1936   8 Sheets-Sheet 8
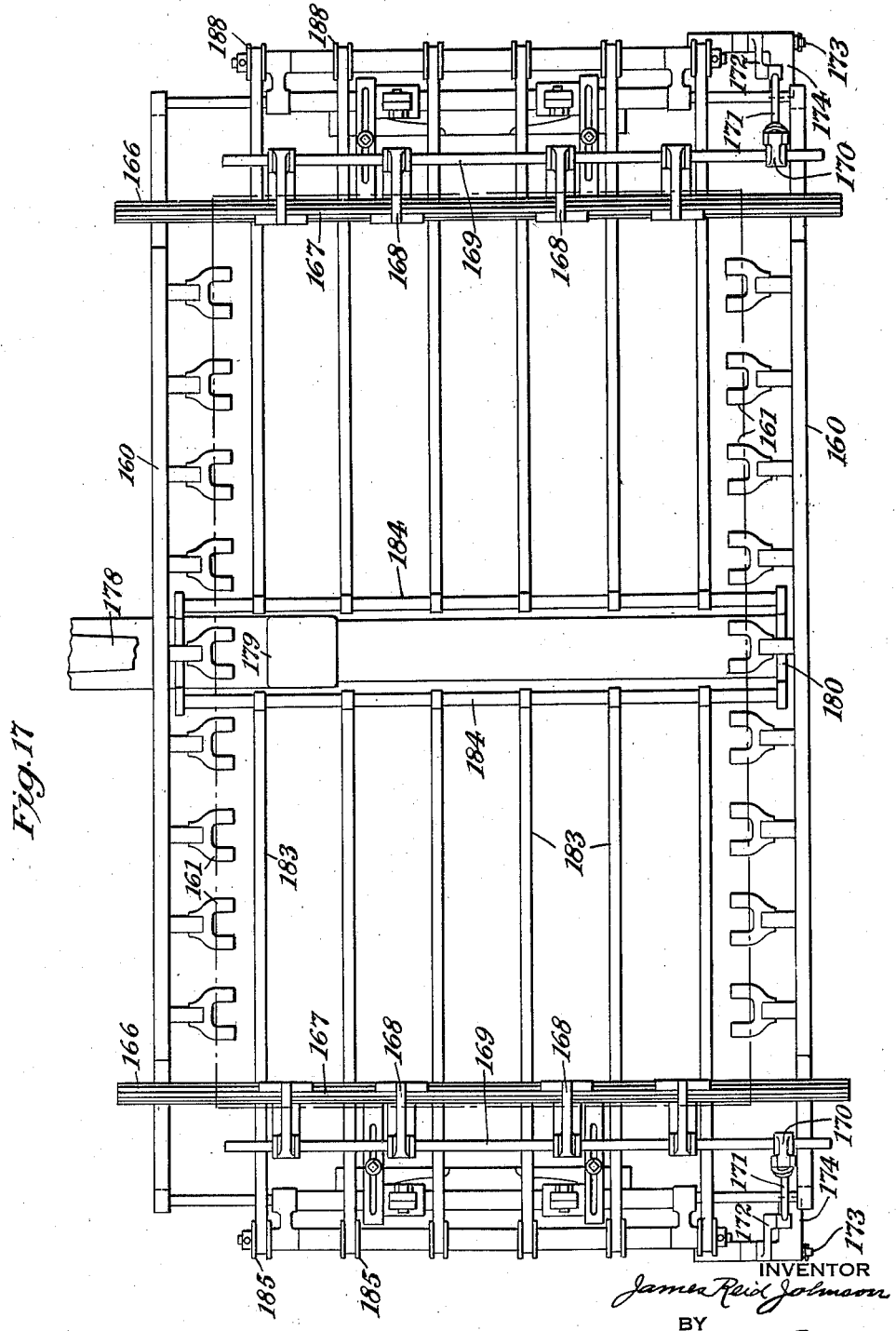
INVENTOR
James Reid Johnson
BY
ATTORNEY Patented Nov. 23, 1937

2,100,104

UNITED STATES PATENT OFFICE 2,100,104

MANUFACTURE OF MATTRESSES

James Reid Johnson, New London, Conn., assignor to The Palmer Brothers Company, New London, Conn., a corporation of Connecticut Application January 10, 1936, Serial No. 58,524

7 Claims. (Cl. 5—345)

My invention relates to the manufacture of mattresses, and particularly to mattresses which embody a pre-sewed casing into which a preconstructed spring core is inserted through an aperture which is afterwards closed.

Objects of my invention are to systematize, simplify and improve the successive steps of manufacture; to insure accuracy of workmanship, size and proportions; to prevent distortion; to expedite production; to improve the appearance, attractiveness, efficiency and uniformity of the mattresses; to eliminate defects; and to secure the other advantages hereinafter described.

In the quantity production of mattresses, of the character above mentioned, it is essential that a standard size or sizes of core shall be used, and that the pre-sewn casing shall be accurately proportioned to receive and accommodate the core without being too loose or too tight, or wrinkling or becoming distorted when the core is inserted and the casing finally closed.

When the casing embodies broad layers of light, yielding material, such as fibrous batting, between textile walls, such as a facing and backing, it is most difficult to cut those textile walls, and their inclosed batting in advance to accurate ultimate size. For, owing to the yielding character of the batting and the tendency to relative displacement of the walls and batting, accuracy can not be obtained by an operator manually assembling the parts one by one and securing them together by sewing. And this difficulty is increased where the walls and batting are quilted together; because the quilting draws the walls out of flat planes and shortens or narrows the size of the quilted piece. Besides, if the quilting is done on irregular lines, which are not equally disposed over the whole extent of the walls, the walls will be locally distorted, and their outlines will not correspond with their original contours; and if the parts are then assembled, a distorted casing will be the result.

Where ornamental casing-facings, each composed of several pre-cut sections assembled and sewn together so as to form a design, are used, distortion, due to such cutting, assembling and sewing, is emphasized; and, in addition, the objections above mentioned to assembling units of facing, batting and backing, one by one are present in increased degree.

It is my object to eliminate these difficulties and defects of manufacture, by the use of a system of progressive steps which will produce, expeditiously, complete mattresses, uniform in type and accurate in workmanship.

Figure 2:
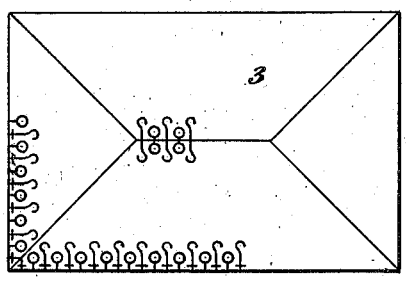
Figure 3:
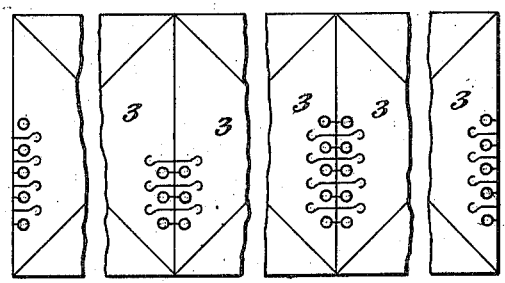
Figure 4:
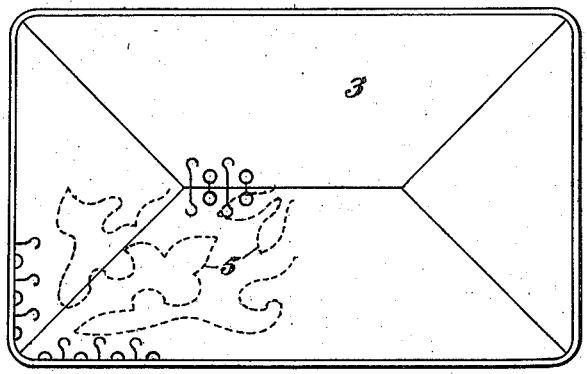
Figure 5:
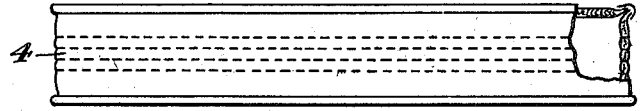
Figure 6:
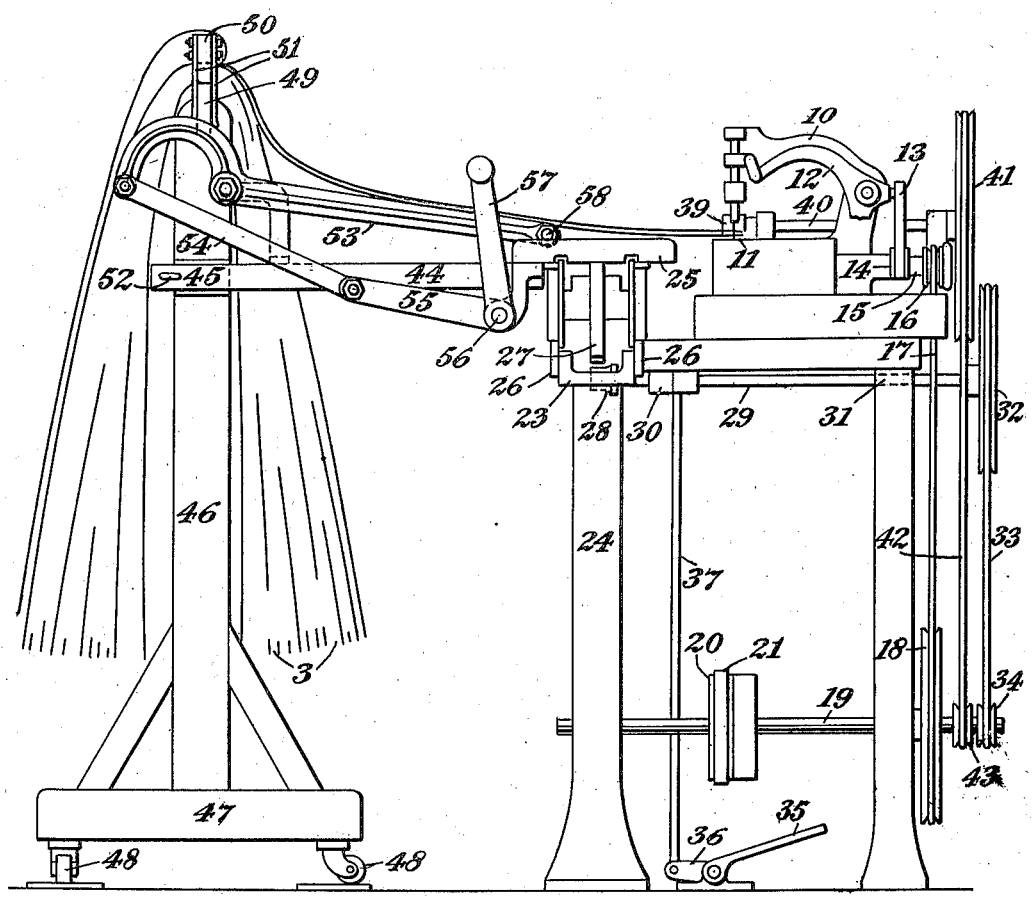

In the drawings, in all of which similar parts are designated by corresponding reference numerals, Fig. 1 is a plan view of a strip of textile material having an ornamental design or pattern thereupon, and adapted to be cut into pieces which may be reassembled into a panel-like design for the formation of a mattress-casing face; Fig. 2, shows such a panel; Fig. 3 shows a strip made by sewing a plurality of such panels end to end, medial portions being excised to shorten the figure; Fig. 4 is a top or bottom view of a completed mattress casing; Fig. 5 is a side view of the same, one corner being shown in section; Fig. 6 is a side elevation of an apparatus adapted for use in joining the panels to each other; Fig. 7 is a plan view of the same; Fig. 8 is a perspective view of a plurality of panels joined end to end, and partially separated for clearness of illustration; Fig. 9 is a longitudinal elevation, and Fig. 10 is a plan showing, partially diagrammatically, principal elements for continuously assembling the bat and backing, tensioning, edge-sewing, edge-trimming and cutting into panel lengths; Fig. 11 is a cross sectional view, on a relatively enlarged scale, taken on the line 11—11 of Fig. 10; Fig. 12 is a plan view of the left hand portion of Fig. 11; Fig. 13 is a vertical sectional view taken on the line 13—13 of Fig. 11; Fig. 14 is a vertical sectional view taken on the line 14—14 of Fig. 11; Fig. 15 is a horizontal sectional view taken on the line 15—15 of Fig. 14, looking down, Fig. 16 is a side elevation of the principal elements of quilting apparatus, suitable for use in my method; Fig. 17 is a plan view of the same; Fig. 18 is a side elevation on an enlarged scale showing a quilt-holding clamp; Fig. 19 is a plan view of the same; and Fig. 20 is a sectional view taken on the line 20—20 of Fig. 18.

In carrying out my method I proceed as follows:—

I take a strip of textile material having upon one face a more or less continuous, ornamental design or designs, of a character that, when the strip has been cut into pieces and the pieces reassembled, a panel-like design may be obtained of a size adapted for the formation of a mattress-casing face. For instance, if the strip is cut across, at angles of forty-five degrees, into triangles and sections having oppositely inclined ends and straight side edges of more or less length, two of those long sections may be assembled with two of the triangular sections to form an elongated parallelogram of twice the width of the original strip and with the ornamentation disposed in a panelled effect. Such a strip 1 is shown in Fig. 1, which may be cut at angles of forty-five degrees, for instance as indicated in broken lines 2, 2.

The sewing together of the sections making up such a facing, being done by an operator upon a sewing machine, by eye, involves certain unavoidable inaccuracies; so that, in practice, the outline of the panel is apt to be more or less distorted, and the panel more or less wrinkled or puckered. This panel, also is a separated unit, and, as such, it is not adapted for economical, practical, facing use. Such a panel 3 is shown in Fig. 2.

I, therefore, join a number of these composite panels, 3, 3, end to end, into a continuous strip, as indicated in Fig. 3, wherein medial parts are omitted to shorten the figure, preferably employing an apparatus such as that shown in Figs. 6 and 7 of the accompanying drawings.

This apparatus embodies sewing means, and means to be employed in holding a plurality of independent panels in assembled relation, and for successively presenting the proper ends of two panels to the action of the sewing means, folding them back, and later successively presenting the opposite ends of dissimilarly mated panels for sewing together, so that a continuous strip of panels may be obtained.

A conventional sewing machine may be employed, embodying a head 10 and suitable mechanism for operating a needle 11, shown as being a rocking arm 12, reciprocated by a rod 13 driven by a cam 14 on a shaft 15 driven by pulley 16, belt 17, pulley 18, shaft 19, carrying pulley 20, actuated by belt 21 connected with a suitable source of power, not shown.

Upon the flanged top 23 of a support 24 slides a table 25 guided by extensions 26, 26 outside of the table support flanges; and having a rack 27 depending therefrom, adapted to mesh with a pinion 28 on a shaft 29 passing through a swinging arm 30, and loosely through a bearing 31, and connected through pulley 32, belt 33 with pulley 34 fixed on shaft 19.

Through a pivoted pedal 35, arm 36, connecting rod 37, arm 30 carrying bearing 38, the pinion 28 may be raised into mesh with rack 27, or lowered away from the rack. A rotary feeder 39 on shaft 40 is connected through pulley 41, belt 42, pulley 43 with shaft 19 and the source of power.

From the table 25 extend arms 44, 44 each having extending members 45, 45, forming between them sockets, adapted to receive the standards 46, 46 of the panel carrying rack, mounted on bases 47, provided with caster-rollers 48, 48, to facilitate movement, the standards supporting a top bar 49 adapted to have a number of superimposed panel sheets 3 hung over it and held in place by a keeper bar 50 placed above them and held in place by attached arms 51, 51 straddling the top bar, so as to prevent the accidental displacement of the panels. This panel holding rack may be readily connected to the arms 44, 44 and held in place by pins 52, 52 passing through holes in the extensions 45, 45 so that the panel carrying rack will travel along with the table 25, or may be readily released therefrom when the pins 52, 52 are withdrawn.

Pivoted to brackets carried by the arms 44, 44 is a pair of lever arms 53, 53, connected by a link 54, with an arm 55 fixed on a shaft 56 journalled in brackets carried by the table 25, and provided with a fixed crank arm 57; and between the ends of the lever arms 53, 53 extends a rod 58 adapted to lie upon the top of the table 25, or to be raised and flipped back and over the top of the panel support by movement of the crank arm 57.

In carrying out the joining of the panel sheets 3 into a continuous strip, I first arrange them in a succession of superimposed pairs, the first pair being placed, for instance, face to face, and the next pair back to back, and so on, the pack of panels being hung over the top bar 49 and secured by the keeper bar 50, and the rack, carrying the panel pack, being secured in position between the arms 44, 44. The end of the topmost panel is then flung back over the top of the keeper bar 50, as shown in Fig. 6. Over the rod 58, resting upon the table 25, are drawn the ends of the next two panels of the pack, that is the second panel of the uppermost pair and the first panel of the next pair, and these ends are drawn forward, by the operator, into proper position for presentation to the sewing machine, which is thrown into action by the operator, the table feed being simultaneously started, the movement being continued until the seam joining the ends of the two panels is completed, when the sewing and feeding are stopped by the operator.

This movement of the table brings the handle of the crank arm 57 within convenient reach of the operator, who is positioned close to the sewing machine, and who then turns the crank so as to throw up the pair of sewed panels and flip them back with a quick, tossing movement over the top of the keeper bar 50 to hang down on its opposite side over the previously turned-back top panel. The rod 58 is then swung back to rest on the table, which is returned by the operator to its initial position. The ends of the next two panels are then drawn onto the table, over the rod 58 and are sewed together in the same way as the preceding pair, and then flipped back; and this operation is repeated until the bottom of the pack is reached, when there will be one odd panel left.

The panel rack is then disconnected from the arms 44, and turned end for end, and again fastened to the arms; and the sewed panel ends may be then turned back into their original positions.

The ends of the uppermost panel and the next panel to it are then sewed together, in a similar manner to that already described, and the operation is continued until all the unsewed ends have been similarly united in pairs; when all the panels of the pack will have been joined into a continuous strip, as illustrated in Fig. 8.

This method results in the accurate, expeditious and uniform uniting of the panels into a continuous strip which is conveniently folded for further operations.

It avoids the clumsy, cumbersome work of sewing one panel after another to form a continuous roll or pack, which must be repeatedly manipulated by the operator, in a more or less loose and irregular form, the handling of which becomes more and more difficult as the sewing progresses, and is likely to produce undesirable irregularities and distortions of the work.

Other means than those illustrated might be employed for holding and moving and presenting the panels for the action of the sewing machine; and I have described the above mechanism only as showing one type wherewith the desired results may be accomplished.

The continuous panel strip is now ready for continuous assembling with the bat and backing tensioning, edge-sewing and edge trimming, and cutting into panel length with the aid of suitable apparatus such, for instance, as is shown in Figs. 9, 10, 11, 12, 13, 14, and 15.

Backing 60 is drawn forward from a source of supply, not shown, in a continuous strip, and as it progresses the bat 61, from another source of supply, not shown, is spread on the backing, and travels with it, the continuous strip of facing panels 3, 3, 3, being fed on top of the bat, which may be done readily by drawing from the folded pack of sewed panels, the assembled elements being pulled forward by rolls 63, 63, 64, 64 which engage only with the margins of the assembly on each side, being rotated by any suitable means, not shown, so as to draw the assembly forward.

Longitudinal tension may be provided by any suitable mechanical means, to place a drag upon the backing and facing. But lateral tensioning, because of the bat, and the unavoidable wrinkling and puckering due to the previous sewing up of the panels, is not satisfactorily accomplished by mechanical means; so that it is found to be desirable to do this tensioning by the hands, as 65, 65, 66, 66, of the operators, stationed opposite to and pulling against each other, so as to present the assembly in a properly smoothed and tensioned condition for edge sewing near each edge by conventional sewing machines indicated at 67 and 68.

The edge-sewed assembly then passes a pair of rotary cutters 69, 70, driven as by motors 71, 72, which trim off the surplus edges, outside of the edge seams, so as to leave the assembly with continuous, uniform, straight edges.

The edge-sewed and edge-trimmed assembly is then drawn forward by another pair of feed rolls, 73, 74 actuated by suitable means, not shown, and allowed to accumulate somewhat in slack form before the next operation, which is intermittent, and consists in severing the assembly into appropriate panel lengths, in doing which suitable mechanical means may be utilized, such as that shown at the right in Figs. 9 and 10, and in Figs. 11 to 15.

This apparatus embraces table elements 75, 76 between the opposed ends of which is a transverse slot 77, above which swings a bar 78, carried by arms 79, 79, fixed on a shaft 80, journalled below the table 76, the bar 78 being depressible, through arm 81, link 82 and pedal 83, and being raised, when free, by the spring 84 between the arm 85 and the table frame 76. A rotary, toothed, disk cutter 87, is arranged to move back and forth in the slit 77, being mounted on a carriage 88, traveling on a track 89, on rollers 90, 90, and steadied by flanges 91, 91 embracing the lower edge of the track 89, the cutter being actuated by a belt 92 running over a fixed pulley 93 on the shaft of the cutter 87, between idlers 94, 94 on the carriage, and over pulleys 95, 96 on the frame of the apparatus.

A shaft 100 is mounted in the frame of the machine and carries an idler 101 and two fixed pulleys 102 and 103. It also carries fixed pulleys 104 and 96. A driving belt 105 runs over the idler 101, or pulleys 102, or 103.

On the shaft 107, journalled in the opposite end of the frame of the apparatus, are mounted fixed pulleys 108, 109, 95.

Over the pulleys 104 and 108 runs a cross belt 110.

It will be seen that when the belt 105 is shifted in one direction, for instance, to the right in Fig. 10, the rotary cutter will be caused to turn in one direction, and when the belt 105 is shifted in the opposite direction, for instance to the left, the rotary cutter will be caused to turn in the opposite direction.

In the frame of the machine is mounted a gear 112 meshing with a spur gear 113 on a shaft 114, journalled in the machine and carrying a pulley 115, around which and around the pulley 109 travels a belt 116. On an extension 117 of the bracket 118, which carries the gear 112, is mounted a take-up gear 119, and on the shaft 120, which carries the gear 112, is mounted another gear 121; and still another pulley 122 is mounted on the shaft 100; and over the pulleys 109 and 122 and gears 119 and 121 runs a sprocket chain 123, which is normally tight.

On the shaft 114 is pivoted an arm 126 carrying a belt tightening pulley 127 which normally bears against the belt 116. A rod 128 extends from the pivoted arm 126 down to a connection with the pivoted arm 129 of the pedal 83 so that when the pedal is depressed the arm will be raised and the belt tightening pulley pressed against the belt 116 causing the belt, which has been loose and inoperative, to grip its pulleys and actuate the link belt 123 causing the rotary cutter carriage to travel.

The link belt 123 is fastened to the travelling carriage 88 and it has attached to it a stop 131 adapted to engage with one end of a pivoted arm 132 so as to rock the arm when the carriage has travelled a sufficient distance to the right to bring the stop in contact with the arm.

This rocking of the arm actuates a belt shifter 133, through connections hereinafter described, and throws the belt 105 onto the idler 101 and stops the rotation and travel of the rotary cutter.

When the pedal 83 is depressed it draws down the rod 82, rocks the arm 81 and through its shaft 80 causes the arm 136 to move as to the right in Figs. 14 and 15. This movement carries with it the T headed actuating rod 137 one arm 138 of the head of which will engage with a pin 139 on a three armed bell crank 140, one arm 141 of which is connected to a slide 142 carrying a cam slot 143 and travelling in a guide 144 attached to the frame of the machine. A pin 145 on an arm 146 of the bell crank 133, 146, pivoted to the frame, as at 147 travels in the cam slot 143, the other arm 133 of the bell crank 133, 146 constituting the shifter which controls the belt 105; so that by the retraction of the rod 137 the slide 142 will be drawn forward.

This will move the belt shifter so as to shift the belt from its central position on the idler 101 to drive the pulley 102, causing the cross belt 110 to turn the fixed pulley 108 and the pulley 109 to drive the belt 116 which, simultaneously with the shifting of the belt, has been tightened by means of the lever 83, pivoted at 130 to the pedal 83 actuating the belt tightening mechanism already described.

The tightening of the belt causes the pulley 115 to be turned, carrying with it the pinion 113, which meshes with the gear 112 turning with the sprocket 121 and driving the link belt 123 which travels around the pulleys 109 and 122, and is kept to duty by the idler 119. The link belt carries besides the stop 131 another stop 150 the distance between the stops corresponding substantially with the travel of the cutter carriage 88 which is fastened to the link belt. The rotation of the pulley 109 causes the pulley 95, fixed on the same shaft, to turn, and drive the belt 92 which travels around the pulleys 95, 96, and between idlers 94, 94 and over a pulley 93 on the shaft of the rotary cutter, thereby turning the cutter. This results in the travelling of the cutter carriage on its track, and the rotation of the cutter, which movements continue until the stop 131 on the link belt encounters the pivoted arm 132 at the opposite side of the machine and rocks that arm causing its lower end, which projects through an opening in an arm 151 to rock that arm, and through it the shaft 152 mounted in the frame of the machine and carrying a rocking arm 153 one end of which is pivoted to one end of a link 154, the other end of which link is pivoted to the arm 155 of the three armed bell crank 140.

The other end of the arm 153 is connected by link 156 with the rod 137. Consequently the rocking of the three armed bell crank by the pull of the rod 137 against pin 139 will draw the slide 142 forward so that the pin 145 will travel up in the cam slot, thus causing the belt shifter to shift the drive belt from the idler to pulley 102. At the same time, the end of the arm 153 through the bell crank 140 draws the T-headed rod 137 sideways so that its arm 148 will be in a position to intercept the pin 149 on the three armed bell crank, when the arm 137 is again pulled forward by the depression of the pedal 83.

When the carriage 88 travels to the right, the link belt 123 carries the stop 150 with it to the limit of travel of the carriage. And when, on the depression of the pedal 83, the movement of the carriage is reversed and it returns to its previous position, the stop 150 will engage and rock the pivoted arm 132 causing the driving belt to be shifted into neutral position upon the idler 101.

In the cutting off step of my method it is important that the panel strip shall be severed into sections of approximately the right length, and on lines which will leave the panelled ornamentation properly balanced. It is also important that in cutting off the panels the materials of the panel strip should not be disarranged or distorted, but should retain their proper positions after the severance has been made. The fact that the backing and facing and the bat are not fastened to each other, except marginally, emphasize the likelihood of disarrangement or displacement under casual handling.

I, therefore, find it necessary to positively hold the facing, backing and bat in their relative positions, against displacement, on both sides of the cutting line, and with sufficient firmness to prevent the disarrangement of the parts by the cutter. And with the aid of suitable means, such as, for instance, as the apparatus which I have last above described, this can be satisfactorily accomplished because the assembled facing, bat and backing are positively held against the tables on each side of the cutting line by the channel bar 78, so that the edge of the rotary cutter may sever the assembly, the cutter's edge turning freely in the space of the channel, and the edges of the material on each side of the line of severance being left in their normal condition. The length of the severed panel may be readily decided by the aid of a suitable stop or stops 62, 62, on the table 76 to which the free edge of the panel may be drawn before the channel bar 78 is lowered into place. The apparatus which I have described expedites the cutting off operation by rendering it unnecessary to return the cutter from one side to the other of the apparatus or to readjust it for each successive cutting operation; because the cutter functions properly to cut successively in each direction, so that when it has made one cut it is ready without readjustment to make the succeeding cut.

The materials having now been assembled and cut into proper panel lengths the next step of my method is to secure them together medially in an ornamental way and without distortion.

To accomplish this the composite panel unit of facing, bat and backing should be held so as to prevent changes in its outlines during the process of quilting.

In Figs. 16 to 20, inclusive, I have illustrated elements of an apparatus which may be employed to assist in this step of my method.

Horizontally disposed frame bars 160, 160 are provided with spring clamps 161, 161, each embodying a body 162, a pivoted jaw 163, and closing spring 164. These clamps are disposed at the sides of the apparatus, being attached to the bars 160, 160, and may be provided with yieldable pads, as 165, to avoid marring the panel.

Channelled end bars 166, 166 are disposed transversely relative to the side bars; and end-holding bars 167, 167, adapted to register in the channels of bars 166, 166, are carried through arms 168, 168, by shafts 169, 169, which may be rocked by means of crank arms 170, 170, connecting rods 171, 171, crank arms 172, 172, mounted on pivots 173, 173, and pedals 174, 174, the bars 167, 167 being normally depressed by their own weight.

A conventional sewing machine head 177 (broken off in Fig. 16) is carried by an arm 178 supported by a carriage 179 which may move transversely of the apparatus on track 176 in a frame 180, mounted on rollers 181, 181 running on tracks 182 lengthwise of the apparatus, so that transverse and longitudinal motion will be imparted to the sewing machine head. This may be done by hand or automatically, as desired, the means for driving the stitching mechanism, or automatically directing the course of the sewing machine being omitted, as such means are well known in the art.

Supporting straps 183, 183 each extend from one rod 184 over rollers 185, 186, 187, 188, back to the other rod 184, and form a shifting support below the fabric panel, leaving, however, an opening in the line of movement of the sewing machine head. By these means the sewing machine head may be moved both transversely and longitudinally, so that the needle may follow any desired line of stitching on the work.

Stitching along irregular or curved lines to produce figures unequally disposed on the face of the panel, will result in creating uneven tensions therein, because the facing and backing will be drawn toward each other along the lines of stitching. Thus, if an irregular design is used, tension will be increased in the areas where the stitch lines are most numerous, as compared with areas where they are less numerous or where there are no stitches.

The side edges of the panel are held positively by the edge clamps 161, 161; but the end bars 166, 167 permit a certain amount of slipping of the panel, if the quilting tension becomes too marked.

Much of the quilting tension is taken up, practically, in the panel body by compression of the bat and adjustment of the facing and backing. In practice, I have not found it necessary to allow slipping of the panel material in the side clamps. But it is desirable to allow some longitudinal yieldability, in order to avoid undue tensioning due to irregular lines of stitching. This causes the end edges of the panel to assume irregular lines. The proper final length of the panel is the distance between the opposed end bars 167, 167. And before the quilted panel is removed from the clamps, it is distinctly marked along the inside edges of the bars 167, 167 to show the correct end lines of the panel. The panel is then removed from the frame and a line of stitching is run across near each end of the panel; and the ends of the panel are cut off along the marked lines, so that the quilted panel is of the correct final length and width. Mechanism similar to the sewing and cutting mechanism of Figs. 9 and 10, made applicable to one edge only, may be used in this end sewing and trimming.

While it is most important that the length of the casing shall be accurately proportioned to the length of the core which is very definitely fixed by the framework of the spring assembly, the casing may accommodate itself somewhat laterally to the core, by holding the core somewhat under compression in the original assembly. Some slight transverse adjustment of the casing about the core is also provided for by the character of the edge boxing, which I, preferably, use, and which is like the facing units composed of a face, back and interposed bat held together by straight lines of stitches near each edge and by a plurality of intermediate and parallel lines of stitching, which negative longitudinal stretching, while allowing some degree of transverse yielding in the boxing.

Such a type of edge boxing, 4, is shown in Fig. 5 of the drawings; and irregular lines of panel quilting are illustrated in broken lines 5, in Fig. 3.

Two facing units are assembled with a box edging unit in a casing, by sewing their edges together and, preferably, taping them, all eight corners being rounded and completed, and all the seams closed except along one edge between corners, at one end.

The spring core is then flexed or folded upon itself lengthwise, and while held so folded is inserted through the open end seam of the casing, and when completely inserted is allowed to flatten out, progressively from its inner end; after which the end seam is permanently closed. Means and method for accomplishing such insertion of the core are not part of the present invention, and are not therefore herein described.

By the use of the method which I have described I am enabled to systematize and expedite the production of mattresses provided with panel face casings composed of a plurality of joined sections, preferably cut from a strip of material much narrower than the finished casing panel; and also to combine such facing panels with suitable filling and backing secured together by ornamental stitching without distorting the contours of the panels; so that the panels may be of uniform shape and accurate proportions and shall be well adapted for use in the quantity production of mattresses of uniform shape and size.

In describing my improved method I wish it to be understood that I have emphasized the salient and more important steps employed; but that details of practice in manipulation and the carrying out of various steps may, obviously, be varied as occasion may require for the accomplishment of the particular object in view. And I also wish it to be understood that the apparatuses which I have described for use in connection with various steps of my method are to be considered as typical and as illustrating appropriate means for the practice of steps in my method; but are not to be considered in any sense as exclusive means for the purposes mentioned.

Having thus described my invention what I claim and desire to secure by Letters Patent of the United States is:

1. In the method of making a mattress the steps of preparing a plurality of disconnected similar oblong panels, having ornamented faces exemplifying a closed design and each sufficiently large to form the top or bottom of a mattress; assembling a plurality of the panels in superimposed pairs alternately face to face and back to back; sewing together the adjacent ends of the second panel of each pair and the first panel of the next pair; and sewing together successively the other ends of each pair of panels, to unite the panels in a continuous strip; assembling the continuous strip with a continuous bat and backing; cutting the assembly into panel lengths approximately on the lines of juncture of the panel sections; assembling the panels in pairs with a boxing to form mattress casings, and inserting cores therein.

2. In the method of making a mattress the steps of preparing a plurality of similar oblong panels, having ornamented faces exemplifying a closed design and each sufficiently large to form the top or bottom of a mattress; assembling a plurality of the panels in superimposed pairs alternately face to face and back to back; sewing together the adjacent ends of the second panel of each pair and the first panel of the next pair; and sewing together successively the other ends of each pair of panels, to unite the panels in a continuous strip; assembling the strip, continuously with a backing strip and an interposed bat; tensioning the assembly laterally, manually; securing the elements of the assembly together marginally, and cutting it into approximate panel lengths approximately on the lines of juncture of the panel sections; cutting the panels to panel lengths, each including a closed design, assembling such panels in pairs with a boxing to form mattress casings and inserting cores therein.

3. The method of assembling a plurality of rectangular, similar panels having ornamented faces and dissimilar backs into a continuous straight strip, consisting in assembling a plurality of such panels in a pack of superimposed pairs arranged alternately face to face and back to back; and, while the pack is so arranged, sewing together successively the adjacent ends of the second panel of each pair and the first panel of the next pair, and sewing together successively the other ends of each pair of panels, whereby a continuous straight strip of joined panels similarly faced and folded back and forth upon each other is produced.

4. In the method of assembling a plurality of independent, rectangular, oblong, sectional panels having dissimilar faces and backs, each panel being somewhat longer than the ultimate, intended length, into a continuous strip for embodiment with continuous strips of bat and backing consisting in assembling a plurality of the panels in superimposed pairs alternately face to face and back to back; sewing together the adjacent ends of the second panel of each pair and the first panel of the next pair; sewing together successively the other ends of each pair of panels, to unite the panels in a continuous strip; assembling the strip, continuously with a backing strip and an interposed bat; and sewing the same together, and afterward, cutting it into correct panel lengths approximately on the line of juncture of each pair of panels, so as to give panels that will each have a closed design thereon.

5. The method of making a mattress, consisting in preparing a plurality of independent panels each having a closed panel ornamentation on one side and sufficiently large to form the top or bottom of a mattress; assembling a plurality of the panels in superimposed pairs alternately face to face and back to back; sewing together the adjacent ends of the second panel of each pair and the first panel of the next pair; sewing together successively the other ends of each pair of panels to unite the panels in a continuous strip; assembling the strip, continuously with a backing strip and an interposed bat; tensioning the assembly; edge sewing and edge trimming the assembly; cutting it into approximate panel lengths near the zones of juncture of said panel pairs, so as to include said closed panel ornamentation; positively holding each panel length marginally and quilting it in irregular lines while so held; marking on the panel its correct, final end lines; sewing it along said lines; cutting each panel to proper final length; uniting two panel sections with a boxing to form a round cornered casing completely closed except along one end edge seam between corners; inserting a self sustaining wire spring core through the opening, and then permanently closing it.

6. The method of making a mattress, consisting in preparing a plurality of independent panels each having a closed panel ornamentation on one side and sufficiently large to form the top or bottom of a mattress; assembling a plurality of the panels in superimposed pairs alternately face to face and back to back; sewing together the adjacent ends of the second panel of each pair and the first panel of the next pair; sewing together successively the other ends of each pair of panels to unite the panels in a continuous strip; assembling the strip, continuously with a backing strip and an interposed bat; tensioning the assembly; edge sewing and edge trimming the assembly; cutting it into approximate panel lengths near the zones of juncture of said panel pairs, so as to include said closed panel ornamentation; positively holding each panel length marginally but yieldable longitudinally and quilting it in irregular lines while so held; marking on the panel its correct, final end lines; sewing it along said lines; cutting each panel to proper final length; uniting two panel sections with a boxing to form a round cornered casing completely closed except along one end edge seam between corners; inserting a self sustaining wire spring core through the opening, and then permanently closing it.

7. The method of uniting a plurality of independent, rectangular, textile, oblong, sectional panels having dissimilar faces and backs into a continuous straight strip, consisting in assembling a plurality of such panels in a pack of superimposed pairs arranged alternately face to face and back to back; holding the pack midway of its ends against displacement of the panels, sewing together the adjacent ends of a contiguous pair of relatively reversed panels on one end of the pack; turning such sewed ends back over the body of the pack to give access to the next pair of panel ends; successively sewing and turning back in a similar way the ends of the remaining pairs of similarly disposed panels on the same end of the pack; restoring the sewed ends to their positions before sewing; successively sewing together and turning back on the pack the ends of each adjacent pair of panels on the other end of the pack; and restoring such sewed ends to their positions before the sewing, whereby a continuous straight strip of joined panels similarly faced and folded back and forth upon each other is produced.

JAMES REID JOHNSON.